Oct. 14, 1924.

J. RUTHS

SAFETY DEVICE

Filed July 10, 1922

1,511,524

Inventor
J. Ruths,
By Marks&Clerk
Attys.

Patented Oct. 14, 1924.

1,511,524

UNITED STATES PATENT OFFICE.

JOHANNES RUTHS, OF DJURSHOLM, SWEDEN, ASSIGNOR TO AKTIEBOLAGET VAPOR-ACKUMULATOR, OF STOCKHOLM, SWEDEN, A CORPORATION.

SAFETY DEVICE.

Application filed July 10, 1922. Serial No. 574,099.

*To all whom it may concern:*

Be it known that I, JOHANNES RUTHS, a subject of the King of Sweden, residing at Djursholm, Sweden, have invented certain new and useful Improvements in Safety Devices, of which the following is a specification.

In steam boilers and steam accumulators or similar receptacles containing a liquid under pressure and of a temperature corresponding to said pressure fatal accidents may arise in case of a pipe leading from such a receptacle bursting. Owing to the large quantity of steam or water released thereby, explosions may occur under certain circumstances. The pressure in such receptacles being usually so high that in case of a pipe fracture a critical drop of pressure takes place, the outflowing quantity of steam is directly proportional to the smallest section of passage in most cases consisting of the cross-section of the pipe. If a large quantity of steam be suddenly exhausted from such a receptacle, it will easily happen that liquid will be entrained into the pipe, that is to say a so-called over-boiling or priming will take place. To prevent such inconveniences automatic steam pipe isolating valves are frequently inserted, such valves being placed on the market in numerous constructions. Said valves are so constructed as to be closed, if the speed of the medium flowing through the pipe (generally steam) increases too much. These valves are, however, inconvenient in that they are brought into operation, even when they are not desired, the pipe thereby being closed and the work of the plant jeopardized. Furthermore considerable losses of pressure in the pipe in which they are inserted are caused by said valves.

The objects of the present invention are to minimize the danger resulting from the bursting of a pipe leading from the receptacle, to prevent the above mentioned fatal accidents, to prevent said inconveniences, and to limit considerably the section of passage arising upon a pipe fracture, all without interfering in any way with the normal operation.

This invention consists in the arrangement of a Laval nozzle, that is, a gradually expanding nozzle, in connection with the receptacle to prevent an excess quantity of steam passing from the receptacle.

Figure 1:
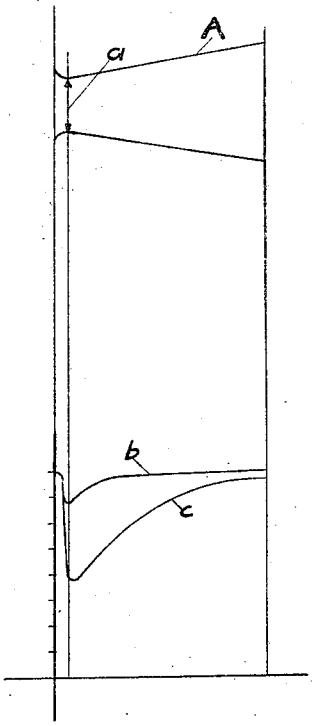
Figure 2:
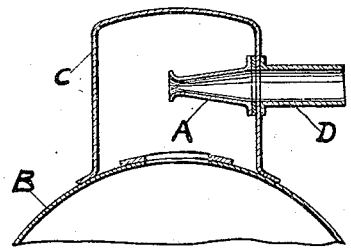
Figure 3:
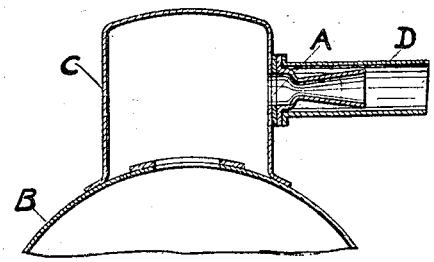

The invention is illustrated in Figs 1 to 3 of the accompanying drawing.

Referring to Fig. 1, this figure shows such a nozzle together with a diagram illustrating the drop of pressure occurring in the same ascertained by experiments therewith. The smallest cross-section of the nozzle designated by A is shown at $a$. The upper curve $b$ shows the course of pressure in the nozzle at a speed of steam of about 30 meters per second in the widest part of the nozzle. As will appear, a drop of pressure takes place to the smallest cross-section, said drop in the nozzle being nearly recovered after the cross-section $a$. Hence it follows that in case of normal speeds of flow in the piping no perceptible loss of pressure will take place in consequence of the insertion of the nozzle.

In case of larger quantities of steam the pressure takes place as indicated by the curve $c$. In such case the loss of pressure increases to the smallest cross-section until the so-called critical drop of pressure occurs between the inlet area and the smallest cross-section of the nozzle. Then the speed at the smallest cross-section is as great as possible. The quantity of steam flowing through the nozzle cannot increase further, however great the drops of pressure through the whole nozzle may be. Consequently, if the piping leading from the nozzle would burst from any reason, the quantity of steam flowing through the same will be limited to the quantity capable of flowing through the smallest cross-section at $a$ upon the critical drop of pressure. Hence it follows that, if this cross-section at $a$ be taken very small, a considerable limitation of the quantity of steam flowing out through a pipe fracture may be attained. It has proved possible to decrease in this manner said cross-section down to one sixth to one tenth of the whole cross-section of the pipe without interfering with the normal operation, the risk occurring from a pipe fracture or over-boiling thus being considerably prevented.

Fig. 2 illustrates an embodiment of the invention. A is the nozzle inserted in the steam dome C of the steam receptacle B. The nozzle is so arranged that the whole quantity of steam passing from the steam receptacle through the piping D has to flow first through said nozzle. As is clearly shown on the drawing the nozzle is connected to the shell of the receptacle by a flanged connection. The pipe or conduit D has also a flanged connection which rests against the shell of the receptacle. These flanges are arranged in such a manner that the flanges of piping D and the nozzle A may be connected by a common connecting means as is well known in the art and are attached to the receptacle at the same point.

Fig. 3 illustrates a further embodiment in which the nozzle A is inserted in the piping D in such a way that the flange of the nozzle A lies between the flange on the pipe D and the shell of the receptacle.

What I claim as new and desire to secure by Letters Patent of the United States of America is:—

1. The combination with a receptacle under pressure, of a Laval nozzle adjacent said receptacle for preventing an excess quantity of steam passing from the receptacle, the receptacle and the Laval nozzle being arranged so that all steam passing from the receptacle must pass through the Laval nozzle.

2. The combination with a steam accumulator under pressure, a conduit for leading steam from the accumulator, of a Laval nozzle adjacent said accumulator arranged in connection with the accumulator and the conduit for preventing an excess quantity of steam passing from the accumulator into the conduit, the accumulator and the Laval nozzle being arranged so that all steam passing from the accumulator passes through the Laval nozzle.

3. In combination with a steam pressure receptacle, a steam outlet therefor, and a piping leading from said outlet, an arrangement for minimizing the danger resulting from rupture in said piping comprising an ever open gradually expanding nozzle arranged adjacent said receptacle.

4. The combination with a steam accumulator and a steam piping leading from said accumulator of an ever open gradually expanding nozzle within the steam space of the accumulator so arranged that all steam passing from the accumulator must pass through the said nozzle.

5. In combination with a receptacle containing steam and water under pressure, an ever open gradually expanding nozzle encompassing the steam flow from said receptacle and attached to said receptacle.

6. In combination with a receptacle containing steam and water, a steam piping leading from said receptacle, a connection between said piping and said receptacle, an ever open gradually expanding nozzle connected to the accumulator by the same aforesaid connection.

7. In combination with a receptacle containing steam and water, a steam piping, a flange on said piping, an ever open gradually expanding nozzle, a flange on said nozzle, said two flanges being connected to the accumulator by the same connecting means.

In testimony whereof I affix my signature in presence of two witnesses.

JOHANNES RUTHS.

Witnesses:
WILMA CHIKSON,
L. BARY WHIDE.